May 12, 1959     K. POLASEK     2,886,762
ALTERNATING CURRENT GENERATOR FOR CONSTANT FREQUENCY
Filed Dec. 15, 1955     2 Sheets-Sheet 1

INVENTOR
KARL POLASEK,
BY
ATTORNEYS

May 12, 1959 K. POLASEK 2,886,762
ALTERNATING CURRENT GENERATOR FOR CONSTANT FREQUENCY
Filed Dec. 15, 1955 2 Sheets-Sheet 2

INVENTOR
KARL POLASEK,
BY Larson and Taylor
ATTORNEYS

United States Patent Office 2,886,762
Patented May 12, 1959

2,886,762

ALTERNATING CURRENT GENERATOR FOR CONSTANT FREQUENCY

Karl Polasek, Bromma, Sweden, assignor to Aero Material AB, Stockholm, Sweden, a corporation of Sweden Application December 15, 1955, Serial No. 553,346

Claims priority, application Sweden December 16, 1954

2 Claims. (Cl. 322—24)

This invention refers to a further development of an alternating current generator according to a prior application Serial No. 256,542, filed on November 15, 1951 (now U.S. Patent No. 2,757,107).

The generator is intended for working within a wide speed range of the prime mover as used on vehicles resp. on aeroplans, where the speed range varies with a proportion of 1 to 3 up to 1 to 4.

The characteristical features of the generator are the combination of two polyphase induction machines, the rotors fixed on the driving shaft, the rotor windings connected in star and connected together, the stator windings connected together in series, the free ends of the stator winding of the first machine connected in star, the free ends of the stator winding of the second machine connected to the line, the line voltage and frequency controlled by a constant frequency feeder of small output, the magnetizing current of the generator fed in by means of a presaturated transformer controlled by Ferraris systems between the generator and the presaturated transformer, the winding axis of the stator of the first machine shifted against the winding axis of the second stator by a determined angle, the first stator equipped with a presaturating winding fed from a tachometer-generator on the driving shaft with a voltage proportional to the rotor speed and from the line with a proper voltage counteracting the tachometer voltage.

Figure 1:
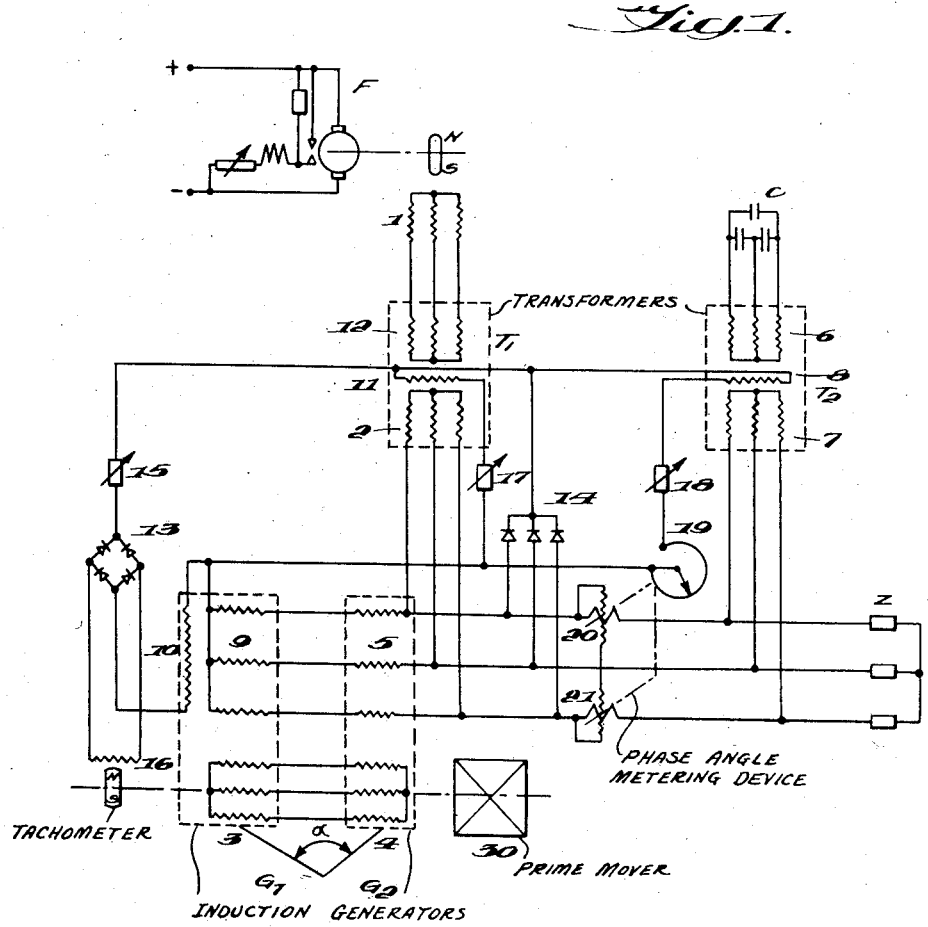
Figure 2:
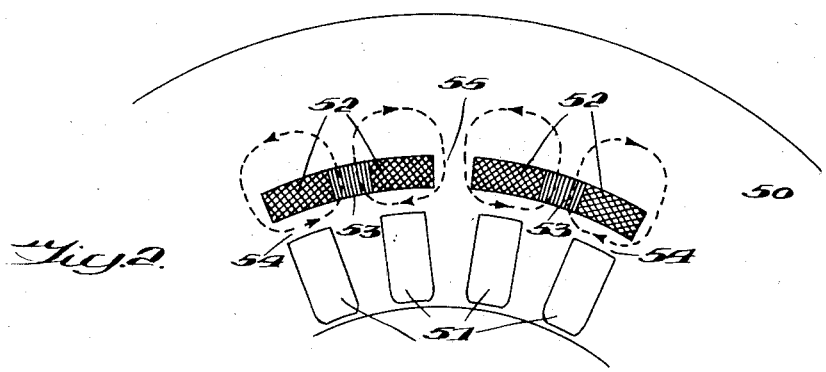
Figure 3:
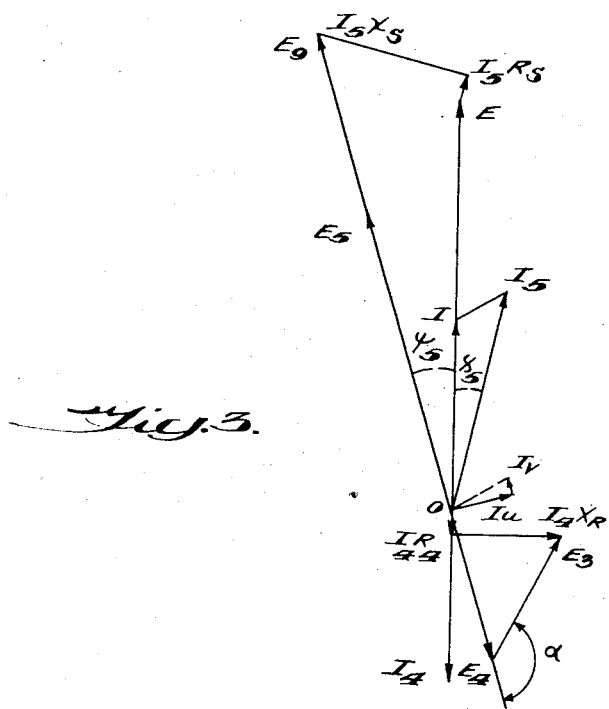

The invention is illustrated in the form of an embodiment thereof shown by way of an example in the attached drawings. Fig. 1 is the elementary wiring scheme of the generator. Fig. 2 is a detail of the construction. Fig. 3 is a vector diagram of the generator.

In Fig. 1, $G_1$ and $G_2$ are two induction machines, preferably of the same size. Their rotors are rigidly mounted on a shaft driven by a prime mover 30 at variable speed. The rotor windings 3 and 4 are connected together and in star. The stator windings 5 and 9 are connected in series with the winding 9 in star and the free ends of the winding 5 connected to the line of the load impedance Z. The stator of the machine $G_1$ is rotatable in relation to the stator of the machine $G_2$, so that the field of the winding 9 can be shifted against the field of the winding 5. A presaturating winding 10 is arranged in the stator of the machine $G_1$.

In parallel to the generator the primary winding 7 of a presaturated transformer $T_2$ is connected to the line. The secondary winding 6 is connected to a condenser bank C. The transformer ratio can be varied by means of a presaturating winding 8.

The line voltage and its frequency is kept constant by means of a frequency feeder 1 of small output. The feeder voltage is fed to the generator by means of a presaturated transformer $T_1$ with its primary winding 12 and its secondary winding 2. The winding ratio is adjustable by a presaturating winding 11.

Between the generator and the transformer $T_2$ together with the load, a phase angle metering device 20, 21 is interconnected. In the example a two phase Ferraris system is used. This rotates the sliding arm of a ring potentiometer 19, which is in series with the presaturating winding 8 of the transformer $T_2$ and with a reset resistance 18. The circuit of winding 8 is fed from the line by means of a rectifier 14. The winding 11 is fed by the same rectifier 14 through a reset resistance 17. By this the voltage level of the line is adjusted.

A small synchronous tachometer generator 16 is rigidly mounted on the generator shaft. Its stator winding is connected via a rectifier 13 to the presaturating winding 10. In series with the rectified tachometer voltage the rectified line voltage is working with opposite polarity upon the winding 10, the circuit current being controlled by an adjustable resistance 15.

The presaturating winding 10 of the machine $G_1$ is according to Fig. 2 placed in slots 52 in the stator core outside of the slots 51 comprising the stator winding 9. The slots 52 are rectangular with a pitch twice the pitch of the slots 51. Each slot 52 contains one coil of the winding 10, each coil being wound round a core 53. These cores consist of laminated transformer steel stripes extending axially through the slot 52 over whole stator length. The cores 53 are as wide as the bridges 55 between two slots 52 and twice as wide as the bridges 54 between the slots 51 and 52. By this arrangement the magnetic passages for the stator flux to the core 50 are equally saturated by the winding 10, and the inductivity of winding 9 is influenced.

The generator works according to the vector diagram in Fig. 3 in the following manner.

$E_5$ is the induced voltage in the winding 5, $E_9$ the induced voltage in the wind 9, $E_5$ and $E_9$ being in phase together. The sum of $E_5$ and $E_9$ is the total induced generator voltage. The sum of the voltage losses in both the windings 5 and 9 by resistance is like $I_5.R_s$ and by leakage reactance $I_5.X_s$.

$R_s$ resp. $X_s$ are the sum of the values for the machines $G_1$ and $G_2$. The line voltage E results by subtracting these stator voltage losses from the induced stator voltage.

The load current in Fig. 3 is assumed in phase with the line voltage. Adding to the load current the magnetizing current $I_\mu$ and the iron loss current $I_v$ the generator current $I_5$ results.

The rotor current $I_4$ is equal and in opposition to the sum of the load current I and the iron loss current $I_v$. The rotor voltage loss by resistance is $I_4.R_r$ and by leakage reactance $I_4.X_r$. Here $R_r$ resp. $X_r$ are the sum of the valves for the machines $G_1$ and $G_2$. The induced rotor voltage $E_4$ in the machine $G_2$ is in opposition to the stator voltage $E_5$. The induced rotor voltage $E_3$ in the machine $G_1$ is in opposition to the stator voltage $E_9$, but shifted in phase by the angle $\alpha$ by mechanically shifting the stator $G_1$ against the stator $G_2$ by an appropriate angle. The angle $\alpha$ and the amplitude of $E_9$ are to be adjusted so that the sum of $E_3$ and $E_4$ is equal to the sum of the rotor voltage losses $I_4.R_r$ plus $I_4X_r$. The voltage loss by the rotor leakage reactance $I_4X_r$ and the induced rotor voltages $E_3$ and $E_4$ is proportional to the generator oversynchronous speed. The voltage loss by the rotor resistance $I_4R_r$ varies only within narrow limits when the oversynchronous speed varies. Therefore the angle $\alpha$ and the amplitude of $E_3$ have to be varied widely at low oversynchronous speed. At higher synchronous speed the angle $\alpha$ ought to be practically constant and only the amplitude of $E_r$ resp. $E_9$ has to be varied somewhat by means of the presaturating winding 10.

The generator ought to be designed so that the low speed range where the angle $\alpha$ has to be varied widely, is reduced to only few percents of the total speed range.

Above this low speed range the angle α is kept constant and the voltage $E_9$ is varied automatically by means of the presaturating winding 10 by the voltage difference between the line voltage from the rectifier 14 and the tachometer voltage from the rectifier 13. The right circuit current is adjusted by the resistance 15.

The line voltage is adjusted by means of the presaturating winding 11 in the transformer $T_1$ and the resistance 15. The voltage $E_8$ in the machine $G_2$ results as the complement to $E_9$ from the adjusted line voltage.

The Ferraris systems 20, 21 are coupled mechanically with the ring potentiometer 19 in such a manner that at inductive load Z an appropriate major part of the resistance 19 is engaged and at capacitive load Z a minor part is working than at pure resistive load Z. At pure resistive load the current in the presaturating winding 8 is adjusted by means of the resistance 18 so that the transformer $T_2$ delivers only the generator magnetizing current from the condenser battery C.

The generator has no sliding contacts as f.i. commutators or slip rings and is very sturdy under load. The weight is not higher than that of an asynchronous generator with an auxiliary commutator machine.

A minute control of the line voltage is achieved by governing the resistance 17 by a usual voltage regulator.

The described generator scheme can be varied within the limits of the scope of the invention.

What is claimed is:

1. An alternating current generator for constant frequency comprising two asynchronous machines, the rotors fixed on a common driving shaft, the rotor windings connected in star and together, the stator windings connected in series, the free ends of the first stator winding connected in star, the free ends of the second stator winding connected to the generator terminals, the first stator winding shifted against the second stator winding by a determined angle, a tachometer generator on the driving shaft, a presaturating winding on the first stator supplied from said tachometer generator, a first rectifier with a voltage proportional to the rotor speed and a second rectifier with an appropriate part of the line voltage counteracting the tachometer voltage connected in the supply circuit of the presaturating winding in order to control automatically the induced voltages in the first asynchronous machine with reference to the rotor speed, a capacitor bank connected through a first presaturable transformer to the line, a power factor sensing device connected between the generator terminals and the line, the ratio of the presaturatable transformer being controlled through its control winding and a control resistance by line voltage and power factor according to load conditions, a constant voltage and constant frequency reference source of small output connected through a second saturatable transformer to the generator terminals, said second transformer controlled through its control winding by the line voltage and the tachometer voltage to maintain a constant frequency and voltage level at the generator terminals.

2. An alternating current generator as claimed in claim 1, wherein the presaturating winding of the first machine is located in slots of the stator core outside of the slots of the main stator winding, the slots of the presaturating winding so displaced that the magnetic paths for the stator flux between main and presaturating slots have half the area of the magnetic paths between the presaturating slots.

No references cited.